(12) United States Patent
Jung et al.

(10) Patent No.: US 6,270,855 B1
(45) Date of Patent: Aug. 7, 2001

(54) POWDER COATING COMPOSITIONS AND METHODS

(75) Inventors: Rolf Jung, Meilen; Christian Schmid, Jona, both of (CH)

(73) Assignee: The Valspar Corporation, Minneapolis, MN (US)

( * ) Notice: Subject to any disclaimer, the term of this patent is extended or adjusted under 35 U.S.C. 154(b) by 0 days.

(21) Appl. No.: 09/270,549

(22) Filed: Mar. 16, 1999

Related U.S. Application Data

(63) Continuation-in-part of application No. 09/117,837, filed on Aug. 12, 1998, now Pat. No. 6,153,264, which is a continuation-in-part of application No. 08/649,480, filed on May 17, 1996, now abandoned.

(51) Int. Cl.[7] .................................................. B05D 1/06
(52) U.S. Cl. ...................... 427/486; 427/482; 428/35.8; 428/418; 428/457; 525/176; 525/177; 525/438; 525/444
(58) Field of Search .................. 525/444, 176, 525/177, 438; 428/35.8, 418, 457; 427/482, 486, 461

(56) References Cited

U.S. PATENT DOCUMENTS

| | | | |
|---|---|---|---|
| 3,382,295 | * 5/1968 | Taylor | 427/314 |
| 4,012,363 | 3/1977 | Brüning et al. | 260/75 |
| 4,104,416 | * 8/1978 | Parthasarathy | 427/29 |
| 4,246,378 | 1/1981 | Kometani et al. | 525/438 |
| 4,526,804 | * 7/1985 | Escallon | 427/32 |
| 5,407,702 | 4/1995 | Smith et al. | 427/211 |
| 5,409,750 | * 4/1995 | Hamada | 428/35.7 |
| 5,500,261 | * 3/1996 | Takei | 428/35.7 |
| 5,736,086 | 4/1998 | Jones et al. | 264/171.17 |

FOREIGN PATENT DOCUMENTS

| | | | |
|---|---|---|---|
| 2096643 | 6/1991 | (CA) | C09D/167/00 |
| 1 446 737 | 10/1969 | (DE) . | |
| 15 46 963 | 4/1970 | (DE) . | |
| 0 067 060 | 12/1982 | (EP) | B05D/1/26 |
| 408 465 A1 | 1/1991 | (EP) . | |
| 0 438 269 A1 | 7/1991 | (EP) . | |
| 0 465 001 A1 | 1/1992 | (EP) | C08J/3/00 |
| 0 614 956 A1 | 9/1994 | (EP) | C09D/167/02 |
| 0 964 038 A2 | 12/1999 | (EP) . | |
| 2 248 844 | 4/1992 | (GB) | C09D/5/03 |
| 62-236870 | 10/1987 | (JP) . | |
| 3-238168 | 10/1991 | (JP) . | |
| WO 94/01224 | 1/1994 | (WO) | B05D/1/26 |
| WO 95/06689 | 9/1995 | (WO) | C09D/163/00 |
| WO 96/35571 | 11/1996 | (WO) | B29C/49/00 |
| WO 97 44394 | 11/1997 | (WO) . | |

OTHER PUBLICATIONS

*Chemical Abstracts*, Registry File RN118330–58–8.
Lo et al., "Synergistic properties of PEN fibers blended with novel thermotropic liquid crystalline copolyesters".
Fiorini et al., "Thermal characterization of poymer blends prepared by reactive blending of PC and PET".
Oh et al., "Transesterification reaction of polyarylate and copolyester (PETG) blends," *Polymer Engineering and Science*, vol. 37, pp. 838–843, (1997).

* cited by examiner

*Primary Examiner*—Patricia A. Short
(74) *Attorney, Agent, or Firm*—Marshall, O'Toole, Gerstein, Murray & Borun

(57) ABSTRACT

Powder coating compositions for metal substrates, a method of powder coating a metal substrate, and a metal article are disclosed. The powder coating composition is a thermoplastic material and comprises: (a) a first polyester having a weight average molecular weight of about 10,000 to about 80,000 and a Tg of greater than 45° C. to about 100° C., (b) a second polyester having a weight average molecular weight of about 10,000 to about 70,000 and a Tg of about −10° C. to about 45° C., and optionally, (c) a modifying resin, such as an epoxy resin having an epoxy equivalent weight of about 500 to about 15,000, wherein the Tg of the first and second polyesters differ by about 5 ° C. to about 60 ° C. The powder coating composition is applied to a metal substrate to provide a composition film having a thickness of about 1 to about 200 microns.

39 Claims, No Drawings

POWDER COATING COMPOSITIONS AND METHODS

CROSS REFERENCE TO RELATED APPLICATIONS

This application is a continuation-in-part application of of U.S. application Ser. No. 09/117,837, filed Aug. 12, 1998, now U.S. Pat. No. 6,153,264, which is the National Stage of International Application No. PCT/US97/08356, filed May 16, 1997 and a continuation-in-part application of U.S. patent application Ser. No. 08/649,480, filed May 17, 1996, now abandoned.

FIELD OF THE INVENTION

The present invention relates to powder coating compositions for metal substrates that, after application, demonstrate excellent adhesion, weatherability, barrier properties, and flexibility; to a method of powder coating a metal substrate; and to a metal article, such as a metal can or container, or a material of construction, such as aluminum siding, having at least one surface coated with an adherent layer of a powder coating composition. A powder coating composition comprises: (a) a first polyester having a weight average molecular weight of about 10,000 to about 80,000 and a glass transition temperature (Tg) of greater than 45° C. to about 100° C., (b) a second polyester having a weight average molecular weight of about 10,000 to about 70,000 and a Tg of about −10° C. to about 45° C., and optionally, (c) a modifying resin, for example, an epoxy or phenoxy resin having an epoxy equivalent weight of about 500 to about 15,000 or an end-capped epoxy resin having a weight average molecular weight ($M_w$) of about 300 to about 10,000, wherein the Tg of the first and second polyester differ by about 5 C° to about 60 C°. The powder coating composition is applied to a metal substrate as a film having a thickness of about 1 to about 200 microns.

BACKGROUND OF THE INVENTION

It is well known that an aqueous solution in contact with an untreated metal substrate can result in corrosion of the untreated metal substrate. Therefore, a metal article, such as a metal container for a water-based product, like a food or beverage, is rendered corrosion resistant in order to retard or eliminate interactions between the water-based product and the metal article. Generally, corrosion resistance is imparted to the metal article, or to a metal substrate in general, by passivating the metal substrate, or by coating the metal substrate with a corrosion-inhibiting coating.

Investigators have sought improved coating compositions that reduce or eliminate corrosion of a metal article and that do not adversely affect an aqueous product packaged in the metal article. For example, investigators have sought to improve the imperviousness of the coating in order to prevent corrosion-causing ions, oxygen molecules, and water molecules from contacting and interacting with a metal substrate. Imperviousness can be improved by providing a thicker, more flexible, and more adhesive coating, but often, improving one advantageous property is achieved at the expense of a second advantageous property.

In addition, practical considerations limit the thickness, adhesive properties, and flexibility of a coating applied to a metal substrate. For example, thick coatings are expensive, require a longer cure time, can be esthetically unpleasing, and can adversely affect the process of stamping and molding the coated metal substrate into a useful metal article. Similarly, the coating should be sufficiently flexible such that the continuity of the coating is not destroyed during stamping and molding of the metal substrate into the desired shape of the metal article.

Investigators also have sought coatings that possess chemical resistance in addition to corrosion inhibition. A useful coating for the interior of a metal container is able to withstand the solvating properties of a product packaged in the metal container. If the coating does not possess sufficient chemical resistance, components of the coating can be extracted into the packaged product and adversely affect the product. Even small amounts of extracted coating components can adversely affect sensitive products, such as beer, by imparting an off-taste to the product.

Conventionally, organic solvent-based coating compositions were used to provide cured coatings having excellent chemical resistance. Such solvent-based compositions include ingredients that are inherently water insoluble, and thereby effectively resist the solvating properties of water-based products packaged in the metal container. However, because of environmental and toxicological concerns, and in order to comply with increasingly strict governmental regulations, an increasing number of coating compositions are water based. The water-based coating compositions include ingredients that are water soluble or water dispersible, and, therefore, cured coatings resulting from water-based coating compositions often are more susceptible to the solvating properties of water.

In addition, water-based coating compositions do not completely overcome the environmental and toxicological problems associated with organic solvents because water-based compositions typically contain two or more pounds of organic solvent per gallon of coating composition. The organic solvent is a necessary ingredient to dissolve and disperse composition ingredients, and to improve the flow and viscosity of the composition. Therefore, in order to entirely avoid the environmental and toxicological problems associated with organic solvents, investigators have sought solid coating compositions that can be applied to a metal substrate. In attempts to find a useful solid coating composition, investigators have tested powder coatings, laminated film coatings, radiation cure coatings, and extrusion coatings.

Solid powder coatings have been used to coat a metal substrate with a coating composition. Solid coating compositions have been extruded onto a metal substrate, for example, as disclosed in European Patent No. 0 067 060, PCT publication WO 94/01224, Smith et al. U.S. Pat. No. 5,407,702, and Jones et al. U.S. Pat. No. 5,736,086. The extrusion coating of a solid composition onto a metal substrate is complicated by the fact that the solid composition must be heated sufficiently to melt the composition for flow through the extrusion apparatus. The heating step either can alter the chemical make-up of the coating composition or can cause a premature cure of the coating composition, especially a thermoset composition, which changes the properties of the coating on the metal substrate or makes extrusion onto the metal substrate difficult due to crosslinking in the extruder.

In order to overcome the problem of premature curing, investigators have attempted to extrude thermoplastic coating compositions onto a metal substrate. These investigators also encountered serious problems, such as composition components having either too high of a molecular weight for easy, economical extrusion, or too low of a molecular weight thereby providing an extruded film that is too soft for many practical applications, such as on the interior or exterior of a food or beverage container.

Investigators, therefore, have sought a solid coating composition for use on the exterior and interior of food and beverage containers that exhibits the advantageous properties of adhesion, flexibility, chemical resistance, and corrosion inhibition, and that is economical and does not adversely affect the taste or other esthetic properties of sensitive foods and beverages packaged in the container. Investigators especially have sought useful powder coating compositions in order to reduce the environmental and toxicological concerns associated with organic solvents. In particular, investigators have sought a solid, powder coating composition for food and beverage containers (1) that meets increasingly strict environmental regulations, (2) has corrosion inhibition properties at least equal to existing organic solvent-based coating compositions, and (3) is easily applied onto a metal substrate, by powder coating techniques, as a thin, uniform film. Such a powder coating composition would satisfy a long-felt need in the art.

A present powder coating composition comprises: (a) a first polyester, (b) a second polyester, and optionally, (c) a modifying resin, wherein the Tg of the first polyester differs from the Tg of the second polyester by about 5 C° to about 60 C°. A present powder coating composition is a thermoplastic composition and can be applied as a powder coating onto a metal substrate. A crosslinking step after application of the composition onto the metal substrate, or use of a crosslinking agent, is not required. A present powder coating composition is free of organic solvents, yet an applied film demonstrates excellent coating properties, such as adhesion, hardness, and flexibility.

A solid, powder coating composition of the present invention contains no organic solvents, and, therefore, overcomes the environmental and toxicological problems associated with liquid coating compositions. The present thermoplastic powder coating compositions also provide a sufficiently flexible coating such that the coated metal substrate can be deformed without destroying film continuity. In contrast, thermosetting compositions often provide a rigid cured film thereby making it difficult to impossible to coat the metal substrate prior to deforming, i.e., shaping, the metal substrate into a metal article, like a metal closure, can, or can end. Coating a metal substrate prior to shaping the metal substrate is the present standard industrial practice.

As an added advantage, it is envisioned that a present powder coating composition can be used on can ends, can bodies, and closures, thereby obviating the use of different coating compositions by container manufacturers. Furthermore, a present powder coating composition exhibits sufficient clarity, hardness, and mar resistance after application for use as a coating on the exterior of a metal container. Accordingly, a powder coating composition of the present invention has a more universal range of applications, such as for the interior coating of a metal container for food or beverage products, or for the exterior coating of a metal container or a material of construction, such as aluminum siding, and overcomes the environmental and toxicological concerns associated with a liquid coating composition.

SUMMARY OF THE INVENTION

The present invention is directed to powder coating compositions that, after application to a metal substrate, effectively inhibit corrosion of the metal substrate, do not adversely affect products packaged in a container having an interior surface coated with the composition, and exhibit excellent flexibility, barrier properties, weathering, chemical resistance, and adhesion. A powder coating composition of the present invention can be used on closures, can ends, and can and drum bodies, and on container interiors and exteriors, as well as materials of construction, like aluminum siding and gutters. A powder coating composition also can be used as a sideseam protection for three piece cans used in the food and aerosol industry. A present powder coating composition effectively inhibits corrosion of ferrous and nonferrous metal substrates when the composition is powder coated onto a surface of the metal substrate.

A present powder coating composition comprises: (a) a first thermoplastic polyester, having a weight average molecular weight ($M_w$) of about 10,000 to about 80,000 and a Tg of greater than 45° C. to about 100° C., (b) a second thermoplastic polyester having an M, of about 10,000 to about 70,000 and a Tg of about −10° C. to about 45° C., and optionally, (c) a modifying resin, such as an epoxy or phenoxy resin having an epoxy equivalent weight (EEW) of about 500 to about 15,000 or an end-capped epoxy resin having an MW of about 300 to about 10,000, wherein the Tg of the first and second polyesters differ by about 5 C° to about 60 C°. The composition is free of organic solvents.

In particular, a present powder coating composition comprises: (a) about 10% to about 90%, by total weight of the composition, of a first polyester having an $M_w$ of about 10,000 to about 80,000, and preferably about 15,000 to about 60,000, (b) about 10% to about 90%, by total weight of the composition, of the second polyester having an $M_w$ of about 10,000 to about 70,000, and preferably about 15,000 to about 50,000, and optionally, (c) 0% to about 25%, by total weight of the composition, of a modifying resin, for example, an epoxy or phenoxy resin having an EEW of about 500 to about 15,000, and preferably about 1000 to about 10,000, or an end-capped epoxy resin having an $M_w$ of about 300 to about 10,000, or an acrylic resin having an $M_w$ of about 15,000 to about 100,000, or a polyolefin having an $M_w$ of about 15,000 to about 1,000,000, or a mixture thereof, wherein the Tg of the first polyester is about 5 C° to about 60 C°, and preferably about 15 C° to about 35 C°, greater than the Tg of the second polyester. To achieve the full advantage of the present invention, the first and second polyesters have a Tg that differ by about 20 C° to about 30 C°. A present extrusion coating composition optionally can include: (d) 0% to about 50%, by total weight of the composition, of an inorganic filler, and (e) 0% to about 4%, by total weight of the composition, of a flow control agent.

The first and second polyesters included in a present powder coating composition are thermoplastic polyesters prepared from an acid, preferably terephthalic acid, isophthalic acid, naphthalene dicarboxylic acid, or a mixture thereof, and an aliphatic diol. At least one polyester preferably is a poly(ethylene terephthalate) (PET) or co-polyester containing terephthalic acid and isophthalic acid. Other preferred polyesters are poly(butylene terephthalate) (PBT), poly(ethylene naphthalene-2,6-dicarboxylate) (PEN), poly (trimethylene terephthalate) (PTT), and poly(trimethylene naphthanate) (PTN).

The polyesters have an acid value of 0 to about 150 mg (milligram) KOH (potassium hydroxide)/g (grams), a hydroxyl value of 0 to about 150 mg KOH/g, and a softening point of about 120° C. to about 200° C. In addition, the polyesters have a melt viscosity of about 200 to about 3000 Pa·s (Pascal seconds), and a melt flow index (MFI) of about 800 g/10 min (minutes) at 200° C. or about 5 g/10 min. at 280° C. In accordance with an important feature of the present invention, the Tg of the first polyester is greater than the Tg of the second polyester by about 5 C° to about 60 C°.

Components (a) and (b), and (c) and (d) and (e), if present, and other optional components are heated and intimately admixed to provide a homogenous powder coating composition. After cooling, the powder coating composition is comminuted into a powder having a particle size sufficient for powder coating.

As used here and hereafter, the term "powder coating composition" is defined as a solid coating composition including a first and second polyesters, an optional modifying resin, an optional filler, an optional flow control agent, and any other optional ingredients. The term "applied coating composition" or "powder coated composition" is defined as an adherent polymeric coating resulting from powder coating a powder coating composition onto a metal substrate.

Therefore, one important aspect of the present invention is to provide a powder coating composition that effectively inhibits the corrosion of ferrous and nonferrous metal substrates. A powder coating composition, after application onto a metal substrate, provides an adherent barrier layer of an applied coating composition that effectively inhibits corrosion, exhibits excellent flexibility and adhesion on the metal substrate, and does not adversely affect a product, such as a food or beverage, that contacts the applied coating composition.

Because of these advantageous properties, an applied coating composition can be used to coat the interior of food and beverage containers and overcome the disadvantages associated with conventional liquid compositions. An applied coating composition comprises the first and second polyesters, and, if present, the modifying resin, the filler, and the flow control agent, essentially in the amounts these ingredients are present in the powder coating composition.

In accordance with another important aspect of the present invention, an applied coating composition demonstrates excellent flexibility and adhesion to a metal substrate. The excellent adhesion of an applied coating composition to a metal substrate improves the barrier and corrosion-inhibiting properties of the coating composition. The excellent flexibility of an applied coating composition facilitates processing of the coated metal substrate into a coated metal article, like in molding or stamping process steps, such that the cured coating composition remains in continuous and intimate contact with the metal substrate. An applied coating composition exhibits excellent chemical resistance and does not adversely affect a food or beverage packaged in a container having an interior surface coated with the cured coating composition. An applied coating composition is sufficiently hard to resist scratching.

In accordance with another important aspect of the present invention, a powder coating composition of the present invention can be powder coated onto a metal substrate to provide a uniform film of a coating composition of about 1 to about 200 microns, and preferably about 10 to about 150 microns. In addition, a present powder coating composition can be used both on the interior and exterior of can bodies and can ends, thereby obviating the need for a container manufacturer to use multiple coating compositions.

These and other aspects and advantages of the present invention will become apparent from the following detailed description of the preferred embodiments.

DETAILED DESCRIPTION OF THE PREFERRED EMBODIMENTS

A powder coating composition of the present invention, after application to a metal substrate, provides an applied coating composition that effectively inhibits the corrosion of metal substrates, such as, but not limited to, aluminum, iron, steel and copper. An applied coating composition also demonstrates excellent adhesion to the metal substrate, excellent chemical resistance and scratch resistance, and excellent flexibility. An applied coating composition does not impart a taste to foods or beverages that contact the applied coating composition.

In general, a present powder coating composition comprises: (a) a first polyester having an $M_w$ of about 10,000 to about 80,000 and a Tg of greater than 45° C. to about 100° C., and (b) a second polyester having an $M_w$ of about 10,000 to about 70,000 and a Tg of about −5° C. to about 45° C. The first polyester has Tg that is about 5 C° to about 60 C° greater than the Tg of the second polyester. The powder-coating composition is a solid and is free of organic solvents.

A powder coating composition optionally can further include: (c) a modifying resin, such as an epoxy or phenoxy resin having an EEW of about 500 to about 15,000 and/or (d) a filler and/or (e) a flow control agent. In addition, a present powder coating composition can include optional ingredients that improve the esthetics of the composition, that facilitate manufacture and/or application of the composition, or that improve a functional property of the composition. The individual composition ingredients are described in more detail below.

(a) Polyesters

In accordance with an important feature of the present invention, a powder coating composition includes a first thermoplastic polyester and a second thermoplastic polyester in a total amount of about 50% to about 100%, by total weight of the composition. Preferably, a powder composition includes about 55% to about 90%, by total weight of the composition, of the first and second polyesters. To achieve the full advantage of the present invention, a powder coating composition includes about 60% to about 85% of the first and second polyesters, by total weight of the composition.

The first and second polyesters are present in the powder coating composition in a weight ratio of first polyester to second polyester of about 9 to 1 to about 1 to 9, preferably from about 6 to 1 and about 1 to 6. To achieve the full advantage of the present invention, the weight ratio of first polyester to second polyester is about 3 to 1 to about 1 to 3.

It should be understood that the first polyester can be a single polyester or a mixture of polyesters, as long as each polyester comprising the first polyester has a Tg of about 45° C. to about 100° C. Similarly, the second polyester can be a single polyester or a mixture of polyesters, as long as each polyester comprising the second polyester has a Tg of about −10° C. to about 40° C. Therefore, as used here and hereafter, the term "first polyester" or "second polyester" refers to a single polyester or to a mixture of two or more polyesters.

Both the first and second polyesters are prepared from a dicarboxylic acid, preferably an aromatic dicarboxylic acid, and an aliphatic diol. These ingredients are interacted to provide a polyester having an $M_w$ of about 10,000 to about 80,000, preferably of about 15,000 to about 60,000, and to achieve the full advantage of the present invention, about 20,000 to about 50,000. Accordingly, the polyesters are considered high molecular weight polyesters. The polyesters have an acid number of about 0 to about 150 mg KOH/g, and preferably about 5 to about 100 mg KOH/g. The polyesters have a hydroxyl number of 0 to about 150 mg KOH/g, and preferably about 5 to about 100 mg KOH/g.

Useful polyesters also possess properties that allow the polyesters to be blended with the optional modifying resins and other composition components, to be powder coated onto a metal substrate, and to provide an applied coating composition having the necessary adhesion and flexibility to be applied to a metal substrate prior to shaping the metal substrate into a metal article. The polyesters also are sufficiently nonreactive such that, when the powder coating composition is melted or heated during preparation or application of the composition, the polyesters do not enter a cross-linking reaction with the optional modifying resin or other composition components.

A polyester used in a present powder coating composition provides an applied coating composition having good film tensile strength, good permeation resistance, retortability, and good barrier properties. The polyesters, and the powder coating composition, therefore, have a softening point of 140° C. or greater, as measured using the procedure set forth in DIN 52011. Preferably, the polyesters and powder coating composition have a softening point of 120° C. to about 200° C. Within this temperature range the applied coating composition exhibited improved pasteurization/retortability resistance.

The first polyester has a Tg of greater than 45° C. to about 100° C., and preferably about 50° C. to about 80° C. To achieve the full advantage of the present invention, the first polyester has a Tg of about 55° C. to about 75° C.

The second polyester has a Tg of about −10° C. to about 45° C., preferably 0C to about 35° C. To achieve the full advantage of the present invention, the second polyester has a Tg of about 5° C. to about 25° C.

The first and second polyesters have Tg's that differ by about 5 C° to 60 C°, and preferably about 15 C° to 35 C°. To achieve the full advantage of the present invention, the difference in Tg's, or ΔTg, between the first and second polyesters is about 20 C° to about 30 C°. In this ΔTg range, the blend of first and second polyesters is sufficiently flexible to permit deformation of an applied coating composition without forming cracks, and is sufficiently hard to exhibit excellent chemical and mar resistance. If the ΔTg of the first and second polyesters is less than about 5 C°, the advantages of a blend of polyesters is not fully realized.

The Tg of the first and second polyester is measured by the following procedure. The ΔTg is simply the difference between the Tg of the first polyester and the Tg of the second polyester.

The glass transition temperature (Tg) of a polymer is the temperature at which an amorphous material changes from a brittle vitreous state to a plastic state. The Tg of a polyester was determined using a Differential Scanning Calorimetry (DSC) instrument in a standard mode. In particular, the method utilized a TA Instruments Model 2920 DSC instrument, with a helium flow gas of 35 cm$^3$/minute. Data was collected on a TA Instruments 3100 Thermal Analyst Computer using an indium standard for temperature calibration.

An indium standard first was prepared in accordance with ISO9000 calibration documentation. A small piece of indium was cut from the stock standard, and placed into an aluminum DSC sample pan with cover, then crimped closed. The standard was heated from 100° C. to 180° C. at 20 C° per minute. A helium gas purge at 35 cc per minute was used. The melting point and heat of melt calculations were made of the indium standard, and the results were entered into the calibration file stored in the Thermal Analyst program on the TA 3100 computer.

A sealed DSC pan containing a polyester sample was placed into the DSC instrument at room temperature. The DSC heating chamber cover was closed. The sample was cooled to −40° C. using either liquid nitrogen in the cooling can or the RSC cooling system. After equilibration of the DSC was reached, the sample was heated at 20 C° per minute through the Tg of the sample by about 10° C. and then cooled to −40° C. again. The sample was reheated at 20 C° per minute through the glass transition temperature and the Tg was determined. The glass transition temperature was calculated at the temperature at the mid-point in the change in heat capacity.

Useful first and second polyesters also exhibit a melt viscosity of about 200 to about 3000 Pa·s (Pascal seconds), and preferably about 20 to about 1000 Pa·s, at 280° C. The melt viscosity is measured using a cone/plate viscometer by the standard PIN ISO 1133 procedure. The melt flow index (MFI), as measured using DIN 53735, of a useful polyester is about 800 g/10 min. at 200° C. or 5 g/10 min. at 280° C.

The first and second polyesters typically are prepared by condensing a dicarboxylic acid with an aliphatic diol. To provide polyesters having optimum properties for an extrusion coating composition for a food or beverage container, the dicarboxylic acid preferably is an aromatic dicarboxylic acid. To achieve the full advantage of the present invention, the dicarboxylic acid comprises terephthalic acid, isophthalic acid, a naphthalene dicarboxylic acid, and mixtures thereof. It is also understood that an esterifiable derivative of a dicarboxylic acid, such as a dimethyl ester or anhydride of a dicarboxylic acid, can be used to prepare the polyester.

In particular, exemplary dicarboxylic acids used to prepare the first and second polyesters include aliphatic and aromatic dicarboxylic acids, such as, but not limited to, phthalic acid, isophthalic acid, terephthalic acid, 5-tert-butyl isophthalic acid, adipic acid, malonic acid, 2,6-naphthalenedicarboxylic acid, 1,5-naphthalenedicarboxylic acid, hexahydroterephthalic acid, 1,4-cyclohexanedicarboxylic acid, sebiacic acid, azeleic acid, succinic acid, glutaric acid, fumaric acid, and mixtures and esterifiable derivatives thereof. Substituted aliphatic and aromatic dicarboxylic acids, such as halogen or alkyl-substituted dicarboxylic acids, also are useful. Preferably, at least 60 mol % aromatic dicarboxylic acids are used to prepare the polyester.

Nonlimiting examples of diols used to prepare the first and second polyesters include ethylene glycol, diethylene glycol, triethylene glycol, propylene glycol, dipropylene glycol, hexylene glycol, butylene glycol, pentylene glycol, neopentyl glycol, trimethylpropane diol, 1,4-cyclohexanedimethanol, 1,10-decanediol, 2,2-dimethyl-1,3-propanediol, 2,2,4,4-tetramethyl-1,3-cyclobutandiol, a polyethylene or polypropylene glycol having a molecular weight of about 500 or less, and mixtures thereof. A small amount of a triol or polyol, i.e., 0 to 3 mole % of diol, can be used to provide a partially branched, as opposed to linear, polyester.

The diol and the dicarboxylic acid, in correct proportions, are interacted under standard esterification procedures to provide a first and second polyester having the necessary $M_w$, Tg, molecular weight distribution, branching, crystallinity, and functionality for use in a present powder coating composition. Examples of useful polyesters can be prepared as set forth in Brunig et al. U.S. Pat. No. 4,012,363, incorporated here by reference, and in Canadian Patent No. 2,091,875.

In addition, useful polyesters are commercially available under the tradename DYNAPOL, from Hutls AG, Berlin, Germany. Examples of specific polyesters are DYNAPOL P1500, DYNAPOL P1510, and DYNAPOL P1550, each available from Huls AG and based on terephthalic acid and/or isophthalic acid. Another useful class of polyesters is the GRILESTA polyesters, like GRILESTA V 79/20, available from EMS. Other useful commercial polyesters include, but are not limited to, SHELL CARIPAK P76, available from Shell Chemicals (Europe), Switzerland; SELAR polyesters, like SELAR PT 6129 and SELAR PT 8307, both available from DuPont Packaging and Industrial Polymers, Wilmington, Del. The CRASTIN polyesters, like CRASTIN 6129, available from DuPont also can be used. CELANEX 3100 and HOECHST 1700A also are useful polyesters.

A polyester also can be prepared by condensing a dicarboxylic acid or derivative of a dicarboxylic acid described above with a low molecular weight epoxy compound. The low molecular weight epoxy compound contains an average of abut 1.5 to about 2.5 epoxy groups per molecule and has an EEW of abut 150 to about 500. An exemplary low molecular weight epoxy compound is EPON 828, available from Shell Chemical Co., Houston, Tex.

Especially useful polyesters include polyethylene terephthalates (PET), polybutylene terephthalates (PET), polyethylene naphthalates (PEN) and polybutylene naphthalates (PBN), polytrimethylene terephthalate (PTT), polytrimethylene naphthanate (PTN), and mixtures thereof.

(b) Optional Modifying Resin

The powder coating composition also includes 0% to about 25%, by total weight of the composition, of an optional modifying resin. Preferably, a powder coating composition contains about 2% to about 20% of an optional modifying resin, by total weight of the composition. To achieve the full advantage of the present invention, the powder coating composition contains about 8% to about 15% of an optional modifying resin, by total weight of the composition.

The optional modifying resin does not substantially react with the polyesters during manufacture of the powder coating composition or during the powder coating process. Accordingly, after application to a metal substrate, the powder coating composition is not subjected a curing step. The modifying resin, however, improves the barrier properties of the applied coating and the adhesion of the powder coating composition to the metal substrate.

One useful modifying resin is an epoxy or phenoxy resin having an EEW of about 500 to about 15,000, and preferably about 1000 to about 10,000. To achieve the full advantage of the present invention, the epoxy or phenoxy resin has an EEW of about 2000 to about 8000. Within the above EEW range for the epoxy or phenoxy resin, the extruded coating composition is sufficiently flexible to permit deformation of an extruded coating composition without forming cracks, and is sufficiently hard to exhibit excellent chemical and mar resistance.

Preferably, the epoxy or phenoxy resin is a solid material that can be melted and admixed with a molten polyester to provide a powder coating composition of the present invention. Preferred epoxy and phenoxy resins contain an average of about 1.5 to about 2.5 epoxy groups per molecule of epoxy resin, but epoxy novolac resins containing greater than about 2.5 epoxy groups per molecule also can be used, i.e., containing about 2.5 epoxy groups to about 6 epoxy groups.

The epoxy or phenoxy resin can be an aliphatic resin or an aromatic resin. The preferred epoxy and phenoxy resins are aromatic, like epoxy and phenoxy resins based on the diglycidyl ether of bisphenol A or bisphenol F. An epoxy resin can be used in its commercially available form, or can be prepared by advancing a low molecular weight epoxy compound by standard methods well known to those skilled in the art.

Exemplary epoxy resins include, but are not limited to, EPON 1004, EPON 1007, and EPON 1009, all available from Shell Chemical Co., Houston, Tex., or ARALDITE® 6099, available from CIBA-GEIGY Corp., Ardsley, N.Y.

In general, suitable epoxy and phenoxy resins are aliphatic-, cycoaliphatic-, or aromatic-based epoxy resins, such as, for example, epoxy resins represented by structural formulae I and II:

(I)

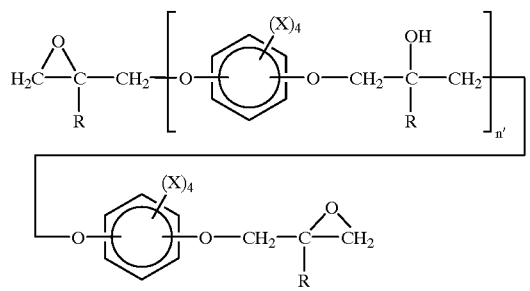

(II)

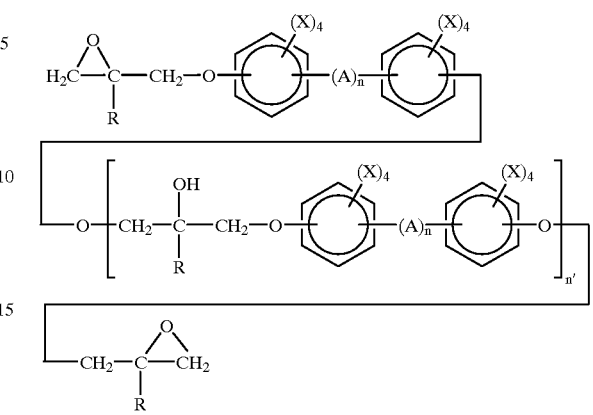

wherein each A is, independently, a divalent hydrocarbyl group having 1 to about 12, preferably 1 to about 6, and most preferably 1 to about 4, carbon atoms; each R is, independently, hydrogen or an alkyl group having 1 to about 3 carbon atoms; each X is, independently, hydrogen, a hydrocarbyl or hydrocarbyloxy group having 1 to about 12, preferably 1 to about 6, and most preferably 1 to about 4, carbon atoms, or a halogen atom, preferably chlorine or bromine; n is 0 or 1, and n' has an average value of about 2 to about 30, and preferably 10 to about 30.

In particular, the preferred epoxy and phenoxy resins are the (diglycidyl ether/bisphenol-A) resins, i.e., polyether diepoxides prepared by the polymeric adduction of bisphenol-A (III)

(III)

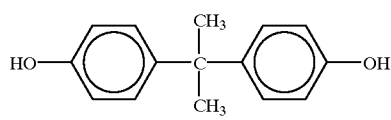

and the diglycidyl ether of bisphenol-A (IV).

(IV)

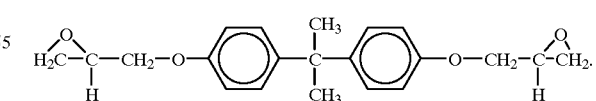

In this case, the epoxy resin is a mixture including polymeric species corresponding to different values of n' in the following idealized formula V:

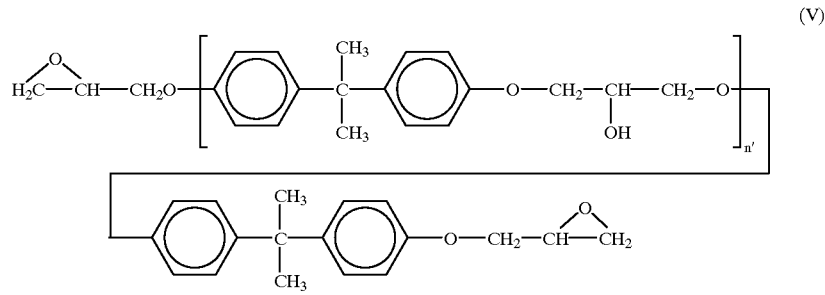
wherein n' is a number from about 2 to about 30.
In addition to bisphenol-A, useful epoxy and phenoxy resins can be prepared by advancing a diglycidyl ether of a bisphenol listed below with an exemplary, but nonlimiting, bisphenol listed below:
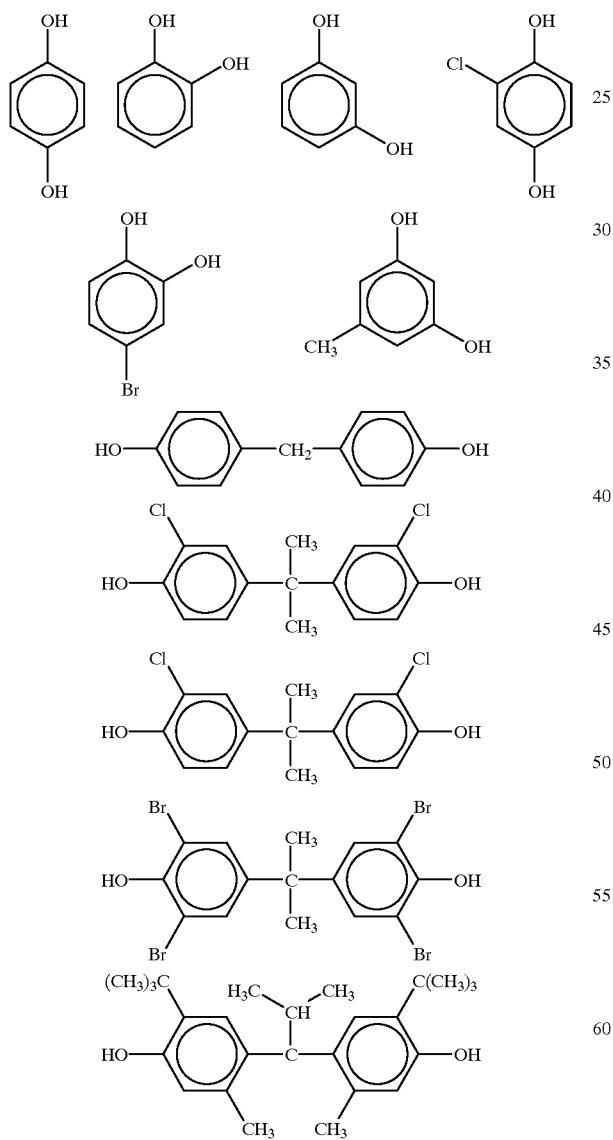
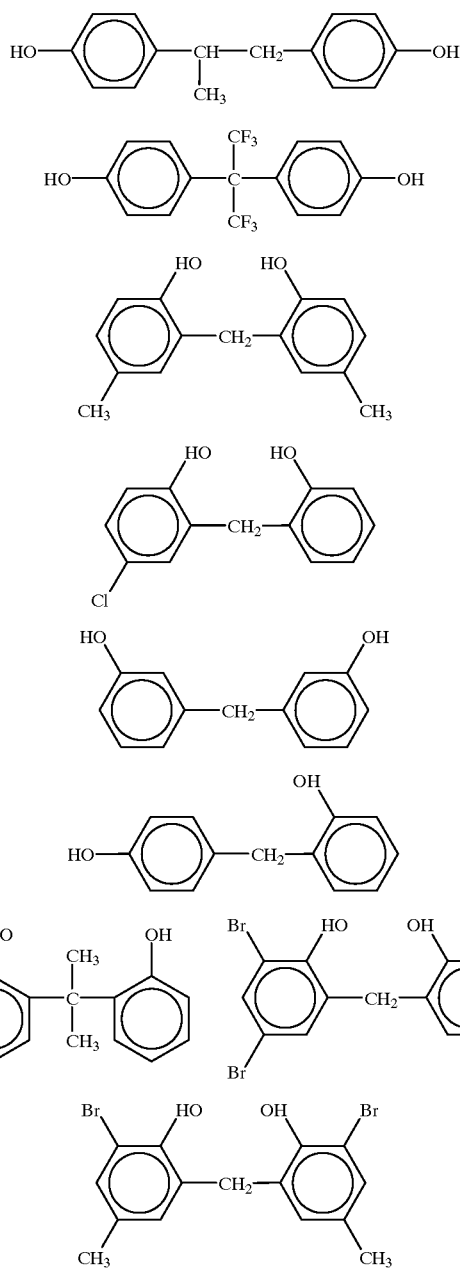

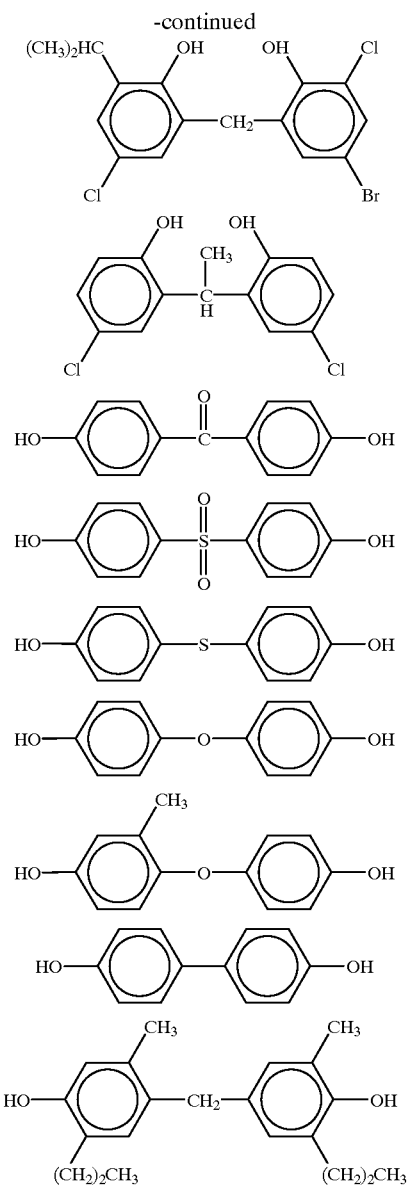

Presently, governmental agencies are issuing regulations directed to the amount of free epoxy groups in coatings present on food and beverage containers and closures. Therefore, for some applications, an epoxy resin is not a suitable modifying resin. In these applications, an end-capped epoxy resin, an acrylic resin, or a polyolefin resin can be used as the optional modifying resin. A mixture of an epoxy resin, an end-capped epoxy resin, an acrylic resin, and a polyolefin resin also can be used.

The end-capped epoxy resins are low-to-medium molecular resins that are based on the above-described epoxy resins and have an $M_w$ of about 300 to about 10,000, and preferably about 600 to about 8,000. To achieve the full advantage of the present invention, the end-capped epoxy resin has an $M_w$ of about 1,000 to about 8,000.

The end-capped epoxy resin is a reaction product between an above-described epoxy resin and a compound having an active hydrogen atom and that is capable of opening an epoxy ring. Classes of such compounds having an active hydrogen atom include alcohols, phenols, carboxylic acids, secondary amines, mercaptans, and oxo-acids of phosphorus, like phosphoric acid, phosphorous acid, and phosphonic acid.

Suitable alcohols and mercaptans include monoprotic $C_1$–$C_8$ alcohols and mercaptans, especially $C_2$–$C_6$ alcohols and mercaptans, either straight-chained or branched. Suitable phenols, and thio-phenols, include all phenols having one active hydrogen. The alcohols and phenols can be substituted with various substituents, like alkyl groups and halogens, that do not react with an epoxy ring in a ring opening reaction. Compounds having more than one active hydrogen atom are avoided because such compounds can enter into crosslinking reactions.

The carboxylic acid can be an aliphatic or an aromatic carboxylic acid. The aliphatic carboxylic acids contain 1 to about 10 carbon atoms, and preferably 2 to about 8 carbon atoms. The aromatic carboxylic acids include benzoic acid and similar aromatic monocarboxylic acids. The carboxylic acids can be substituted with substituents that do not react with an epoxy ring in a ring opening reaction. The acids and substituents therein can be straight-chained or branched. Carboxylic acids like phenylacetic acid and substituted phenylacetic acid also are useful in the present invention.

Secondary amines having the formula $R_1R_2NH$ also can be used to end-cap the epoxy resin. The $R_1$ and $R_2$ groups, independently, are an alkyl or hydroxyalkyl group containing 1 to 6 carbon atoms, or are aryl groups, like phenyl. The alkyl, hydroxyalkyl, and aryl groups can be substituted with substituents that do not react with an epoxy ring in a ring opening reaction.

Phosphorus oxo-acids, like phosphoric acid, phosphorous acid, and phosphonic acid, also can be used to end-cap the epoxy resin. Esters of phosphorus oxo-acids similarly can be used to end-cap the epoxy resin, provided the ester has at least one active hydrogen atom.

An epoxy resin is reacted with a sufficient amount of a compound having an active hydrogen atom to end-cap all the epoxy groups of the resin. Accordingly, a slight excess, in equivalents, of the compound having an active hydrogen atom preferably is used in the reaction.

The acrylic resin has an $M_w$ of about 15,000 to about 100,000, and preferably about 20,000 to about 80,000. Acrylic resins include, but are not limited to, homopolymer and copolymers of acrylic acid, methacrylic acid, esters of acrylic acid, esters of methacrylic acid, acrylamides, and methacrylamides.

The polyolefin resin has an $M_w$ of about 15,000 to about 1,000,000, and preferably about 25,000 to about 750,000. Polyolefin resins include, but are not limited to, homopolymers and copolymers of ethylene, propylene, ethylene-propylene blends, 1-butene, and 1-pentene. The polyolefin also can contain functionalized olefins, such as an olefin functionalized with hydroxy or carboxy groups.

(c) Optional Inorganic Filler

To achieve the full advantage of the present invention, a powder coating composition includes 0% to about 50%, preferably 0% to about 30%, and most preferably 0% to about 25% by total weight of the composition, of an inorganic filler. An inorganic filler is included to improve the physical properties of an applied coating composition.

Exemplary inorganic fillers used in the powder coating composition of the present invention include, but are not limited to, clay, mica, aluminum silicate, fumed silica, magnesium oxide, zinc oxide, barium oxide, calcium sulfate, calcium oxide, aluminum oxide, magnesium aluminum oxide, zinc aluminum oxide, magnesium titanium oxide, iron titanium oxide, calcium titanium oxide, and mixtures thereof. The inorganic filler is essentially nonreactive and is incorporated into the powder coating composition in the form of a powder, generally about 10 to 200 microns in diameter, and in particular, about 50 microns to about 125 microns in diameter.

(d) Optional Flow Control Agent

A powder coating composition of the present invention also can contain a flow control agent to assist in achieving a uniform film of applied coating composition on the metal substrate. The flow control agent is present in an amount of 0% to about 6%, and preferably 0% to about 5%, by total weight of the composition.

An exemplary, but nonlimiting, flow control agent is a polyacrylate available from Henkel Corporation, as PERENOL F 30 P. Another useful polyacrylate flow control agent is ACRYLON MFP. Numerous other compounds and other acrylic resins known to persons skilled in the art also can be used as a flow control agent.

(e) Other Optional Ingredients

A powder coating composition of the present invention also can include other optional ingredients that do not adversely affect the powder coating composition or an applied coating composition resulting therefrom. Such optional ingredients are known in the art, and are included in a powder coating composition to enhance composition esthetics, to facilitate manufacturing and application of the powder coating composition, and to further improve a particular functional property of a powder coating composition or an applied coating composition resulting therefrom.

Such optional ingredients include, for example, dyes, pigments, anticorrosion agents, antioxidants, adhesion promoters, light stabilizers, and mixtures thereof. Each optional ingredient is included in a sufficient amount to serve its intended purpose, but not in such an amount to adversely affect a powder coating composition or an extruded coating composition resulting therefrom.

For example, a pigment, in an amount of 0% to about 50% by weight of the composition, is a common optional ingredient. A typical pigment is titanium dioxide, barium sulfate, carbon black, or an iron oxide. In addition, an organic dye or pigment can be incorporated in the powder coating composition.

In addition, an additional polymer, i.e., a second modifying polymer, can be added to the powder coating composition to improve the properties of the applied coating composition. The second modifying polymer preferably is compatible with the other composition components and does not adversely affect the applied coating composition. To achieve a coated metal substrate having a nongloss finish, the second modifying polymer can be substantially incompatible with the polyesters and optional modifying polymer. The second modifying polymer can be a thermoplastic or a thermoset polymer, and is present in the powder coating composition in an amount of 0% to about 50%, and preferably 0% to about 20%, by total weight of the composition.

Nonlimiting examples of optional second modifying polymers that can be incorporated into the powder coating composition are a carboxylated polyester, a carboxylated polyolefin, a polyamide, a fluorocarbon resin, a polycarbonate, a stirene resin, an ABS (acrylonitrile-butadiene-stirene) resin, a chlorinated polyether, a urethane resin, and similar resins. Polyamide resins include nylon 66, nylon 6, nylon 610, and nylon 11, for example. A useful polyolefin is polyethylene or polypropylene, including homopolymers and copolymers, for example. Fluorocarbon resins include tetrafluorinated polyethylene, trifluorinated monochorinated polyethylene, hexafluorinated ethylene-propylene resin, polyvinyl fluoride, and polyvinylidene fluoride, for example. However, even if an optional second modifying polymer is added to the powder coating composition, the powder coating composition is free of a crosslinking agent and is not subjected to a curing step after extrusion onto a metal substrate.

A powder coating composition of the present invention can be prepared by methods well known in the art, such as by individually heating the first polyester, the second polyester, and the optional modifying resin to a sufficient temperature to melt each ingredient, then admixing the molten polyesters and optional modifying resin, such as in a single screw or double screw extruder, to provide a uniform powder coating composition. Optional ingredients can be added to the powder coating composition either by incorporation into one of the molten ingredients prior to admixture of the molten ingredients, or can be added to the molten powder coating composition after ingredients have been admixed. If an optional second modifying polymer is present in the composition, the second modifying polymer is melted and added to the molten powder coating composition at any convenient step of the manufacturing process. Alternatively, all composition ingredients can be admixed in the solid state, followed by melting the resulting admixture and extrusion, to provide a uniform molten composition.

After a uniform molten composition is prepared, the powder coating composition is allowed to cool and solidify. The resulting powder coating composition then is formed into a powder having a particle size diameter of about 70 to about 100 microns for use in powder coating applications. The powder is stored and kept dry until use in an extrusion process. Preferably, the powder is subjected to a heating step prior to powder coating in order to expel any water absorbed by the powder coating composition during storage.

To demonstrate the usefulness of a powder coating composition of the present invention, the following examples were prepared, then powder coated onto a metal substrate to provide a coated metal substrate. The coated metal substrates then were tested for use as a food or beverage container. The applied coatings were tested for an ability to inhibit corrosion of a metal substrate, for adhesion to the metal substrate, for chemical resistance, for flexibility, and for scratch and mar resistance. Examples 1 through 14 illustrate some important features and embodiments of a powder coating composition of the present invention, and illustrate methods of applying a powder coating composition of the present invention.

The compositions of Examples 1–14 were prepared by admixing and melting the resin components, then adding optional components like titanium dioxide, aluminum silicate, the lubricant, and the flow control agent, with stirring, to the molten resin components. The resulting mixture was heated to maintain the resin components in the molten state. Then, the mixture passed through a twin blade extruder. The resulting compositions of Examples 1–14 were allowed to cool to room temperature and solidify. The compositions then were formed into a powder, the majority having a particle size of about 60$\mu$ (microns) or lower, and a largest particle size of about 90 to 100$\mu$.

The compositions of Examples 1–14 were powder coated onto a metal substrate to provide a coated metal substrate having an adherent barrier layer of an applied composition. A powder coating composition is applied to the substrate as a layer having a thickness of about 1 to about 200$\mu$, and preferably about 10 to about 150$\mu$. To achieve the full advantage of the present invention, a solid coating composition is powder coated at a thickness of about 40 to about 100$\mu$.

| INGREDIENT | EX. 1[1] | EX. 2 |
|---|---|---|
| DYNAPOL P 1500[2] | 67.47 | 50.67 |
| SELAR PT 8307[3] | 17.00 | 33.80 |
| PERENOL F 30P[4] | 0.50 | 0.50 |

-continued

| INGREDIENT | EX. 1[1] | EX. 2 |
|---|---|---|
| Titanium Dioxide[5] | 9.28 | 9.28 |
| BLANCFIX N[6] | 5.75 | 5.25 |

[1] Percent by weight in the composition;
[2] A polyester available from Hüls AG, having a softening point of 170–176° C., a Tg of about 23° C., and a melt viscosity of about 70–80 Pa.s at 240° C.;
[3] A modified polyester available from DuPont Packaging and Industrial Polymers, Wilmington, DE, having a melting point of 220° C., a Tg of about 70° C., and a melt viscosity of about 560 Pa.s at 280° C.;
[4] An acrylic flow control agent available from Henkel Corporation;
[5] Pigment; and
[6] Filler.

| Ingredient | Ex. 3[1] | Ex. 4 |
|---|---|---|
| DYNAPOL P 1500[2] | 62.5 | — |
| GRILESTA V79/20[7] | — | 62.5 |
| SELAR PT 8307[3] | 27.0 | 27.0 |
| PERENOL F 30 P[4] | 0.5 | 0.5 |
| BLANCFIX N[6] | 10.0 | 10.0 |

[7] A polyester available from EMS having a density of about 1.29 g/cm, a melting point of about 15° C., a Tg of about 25° C., and a melt viscosity of about 200 Pa.s at 200° C.

| Ingredient | Ex. 5[1] | Ex. 6 | Ex. 7 | Ex. 8 | Ex. 9 | Ex. 10 (Comparative) |
|---|---|---|---|---|---|---|
| DYNAPOL P 1510[8] | 55.8 | | 55.8 | | | 72.8 |
| GRILESTA V79/20[7] | | 55.8 | | 55.8 | 61.5 | |
| DYNAPOL P 1500[2] | | | | | | |
| DYNAPOL S 1690[9] | | | | | | 3.6 |
| Phenoxy Resin[10] | | | | | | 3.6 |
| SELAR PT 8307[3] | 24.2 | 24.2 | 24.2 | 24.2 | 26.5 | |
| Titanium Dioxide[5] | 8.0 | 8.0 | | | | |
| BLANCFIX N[6] | 5.0 | 5.0 | 5.0 | 5.0 | 3.0 | 5.0 |
| Aluminum Silicate[6] | 4.0 | 4.0 | 13.0 | 13.0 | 7.8 | 13.0 |
| Mica[11] | 3.0 | 3.0 | 2.8 | 2.0 | 1.2 | 2.0 |
| PERENOL F 30 P[4] | 0.5 | 0.5 | 0.5 | 0.5 | 0.5 | 0.5 |

[8] A polyester available from Hüls AG, having a melting point of 147–154° C., a Tg of about 23° C., a melt viscosity of about 35.40 Pa · s at 240° C., and a melt index of about 120 g/10 min at 200° C.;
[9] An amorphous polyester available from Hüls AG, having a softening temperature of 130° C., a Tg of about 40° C., and a viscosity number of about 55–65 cm²/g (DIN53726);
[10] PHENOXY PKHH, a phenoxy resin available from Phenoxy Associates having an $M_w$ of about 14,000 to about 16,000 and an EEW > 100,000; and
[11] Micro Mica.

Examples 5–7 are white, and Examples 8–10 are colorless. The following Example 11 also is colorless. Examples 12 and 13 are white.

| Ingredient | Ex. 11[1] | Ex. 12 | Ex. 13 |
|---|---|---|---|
| DYNAPOL P 1510[8] | 35.2 | 33.5 | 33.5 |
| GRILESTA V79/20[7] | 23.3 | 22.0 | 22.0 |
| SELAR PT 8307[3] | 25.0 | 24.0 | — |
| CRYSTAR 4446[12] | — | — | 24.0 |
| PERENOL F 30 P[4] | 0.5 | 0.5 | 0.5 |
| BLANC FIX N[6] | 4.0 | 5.0 | 5.0 |
| Aluminum Silicate[6] | 10.4 | 4.0 | 4.0 |
| Mica[11] | 1.6 | 3.0 | 3.0 |
| Titanium Dioxide[5] | — | 8.0 | 8.0 |

[12] A polyester available from DuPont Packaging and Industrial Polymers, Wilmington, DE, having a softening point of 220° C., a Tg of about 73° C., and a melt viscosity of about 250 Pa.s at 270° C.

In another example, Example 14, the powder coating composition of Example 13 (99.68 parts by weight) is admixed with 0.12 parts by weight fumed silica (e.g., CABOSIL TS610 or AEROSIL R 972) and 0.20 parts by weight of a wax (Hoechst Wach C micro) to provide improved handling and application properties.

The first test performed on powder coating compositions of the present invention was to determine whether the first and second polyesters retained their individual identities (i.e., their distinct Tg's) during the processes of manufacturing the composition and applying the composition onto a metal substrate, or whether a transesterification reaction occurred to form an alloy having a single Tg. In this test, eight separate samples of powder coating compositions were treated in an extruder at 300° C. for various lengths of time. The samples contained either a blend of DYNAPOL 1500 and CARIPAK P76 (a polyethylene terephthalate polyester available from Shell Chemicals (Europe), Switzerland), or a blend of DYNAPOL 1500 and a polyethylene naphthalene-dicarboxylate (PEN 14991 available from Eastman Chemicals, Kingsport, Tenn.).

The extruded compositions were analyzed by Differential Scanning Calorimetry (DSC). The individual polyesters present in the extrusion coating compositions also were tested by DSC. In particular, a TA Instrument Model 2920 Differential Scanning Calorimetry instrument was used to determine if the extruded products were blends or alloys of the starting polyester. Samples were prepared for analysis by cutting a small sample (e.g., 10 to 15 mg in weight) from an extruded film with a razor blade. The sample was placed into an aluminum DSC sample pan, covered, and sealed. The sample pan then was placed into the DSC apparatus and cooled to −50° C. Each sample was heated at a rate of 20 C° per minute to 300° C.

After a first heating, each sample was rapidly cooled from its melt point down to −50° C. A second heating was performed on each sample, and the thermal transitions were recorded. Each composition was analyzed under the same conditions as the individual polyesters. The first heating of each composition revealed multiple transitions that were matched with transitions attributed to the starting polyesters. For example, a P1500/PEN sample conditioned at 300° C. for 2 minutes provided a Tg that matched the DYNAPOL starting component and a Tg that matched the PEN starting component. No other thermal transitions were detected. The thermal analysis results showed that the composition was a blend of the starting polyesters. A polymer alloy was not formed from the individual polyesters. Thermal analyses using different conditioning times all revealed similar findings. Thermal analysis of the DYNAPOL 1500/CARIPAK P76 coating compositions after extrusion also was a blend of the starting polyesters, as opposed to an alloy.

The metal substrates powder coated with a composition of Examples 1–14 then were tested for use as the interior surface of a food or beverage container. As will be demonstrated more fully hereafter, an applied coating composition resulting from powder coating a coating composition of the present invention is suitable as the interior coating of a metal container for food or beverages. A present powder coating composition provided excellent applied coatings in the absence of a curing step.

In particular, a powder coating composition of the present invention can be applied to essentially any metal substrate. Nonlimiting examples of metal substrates are aluminum, tin-free steel, tinplate, steel, zinc-plated steel, zinc alloy-plated steel, lead-plated steel, lead alloy-plated steel, aluminum-plated steel, aluminum alloy-plated steel, and stainless steel.

In a powder coating method, a powder coating composition is electrostatically charged by Corona or Tribo and is sprayed onto an electrically grounded metal substrate. In general, the metal substrate is at a temperature that is greater than the melting temperature of the powder coating composition, typically about 120° C. to about 300° C., and preferably about 200° C. to about 300° C. The coating film builds up over 10 minutes at 200° C., or over 5 seconds at 300° C., peak metal temperature. Conventionally, the application time and temperature is about 190° C. to about 350° C. for 5 seconds to 15 minutes.

The powder coating composition does not cure or crosslink to any substantial extent during, or after, application onto the substrate. Therefore, a step of curing the applied composition at an elevated temperature is omitted. However, to optimize the properties of the applied composition, the coated metal substrate, either before or after cooling, preferentially is subjected to a post-application heating step conducted at about 120° C. to about 550° C. (peak metal temperature) for about 5 to about 30 seconds, and preferably about 180° C. to about 450° C. for about 10 to about 20 seconds.

The resulting applied coating compositions had a smooth, glossy appearance, and were defect free. The present solid applied coating compositions provide a highly protective, self-lubricating layer when applied onto a metal substrate. The applied coatings had good adhesion and exhibited good barrier and anticorrosion properties.

Overall, a powder coating composition of the present invention demonstrates the advantages of optionally eliminating chemical pretreatment of the metal substrate; optionally substituting the use of a small induction oven for preheating the metal substrate and for postheating in place of a large convection oven for drying a liquid composition; using a solid composition containing no organic compounds in place of a liquid containing organic solvents; elimination of lubricating stations; and elimination of solvent incinerators.

Various tests were performed on the powder coating compositions. These tests showed that the present powder coating compositions exhibit coating properties at least equal to current commercial compositions used for similar practical applications. The data summarized below illustrates that a powder coating composition of the present invention provides an applied coating composition useful on the interior or exterior coating of a food or beverage container.

In particular, a coating composition for a metal container must demonstrate excellent adhesion and flexibility because metal containers are manufactured by first coating flat sheets of the metal substrate, then forming the coated sheets into a desired shape. Coatings having poor adhesion properties can separate from the metal substrate during the shaping process. A lack of adhesion, therefore, can adversely affect the ability of the cured coating composition to inhibit corrosion of the metal substrate. A present powder coating composition exhibits an excellent adhesion to a metal substrate, and, therefore, a coating can be extruded onto a metal substrate, and the metal substrate subsequently can be deformed without adversely affecting continuity of the coating film.

The applied coating compositions also have excellent flexibility. Flexibility is an important property of a polymeric coating because the metal substrate is coated prior to stamping or otherwise shaping the metal substrate into a desired metal article, such as a metal container. The coated metal substrate undergoes severe deformations during the shaping process, and if a coating lacks sufficient flexibility, the coating can form cracks or fractures. Such cracks result in corrosion of the metal substrate because the aqueous contents of the container have greater access to the metal substrate. Metal substrates coated with a present powder coating composition were subjected to a Wedge Bend test, and no cracks or fractures were observed. In addition, as previously described, an applied coating provided by a powder coating composition of the present invention is sufficiently adherent to the metal substrate, and remains sufficiently adherent during processing into a metal article, and, therefore, further enhances corrosion inhibition.

The tests summarized below demonstrate that a present applied coating composition maintains adhesion to the metal substrate, is flexible, is sufficiently hard, and, therefore, is scratch and mar resistant, resists blush, and resists chemical attack. Such a combination of advantages are necessary, or at least desirable, in a coating applied to the interior of food and beverage containers.

The above-described advantages made a powder coating composition of the present invention useful for application on the interior or extrusion surface of a variety of metal articles, such as for the interior of metal containers for foods and beverages. A present powder coating composition is especially useful as a coating on a metal container that holds taste-sensitive foods or beverages, like beer, because the powder coating composition is essentially free of components that affect the taste of the food or beverage.

The tests performed on metal substrates go coated with a powder coating composition of the present invention are well known to persons skilled in the art and are summarized as follows:

Adhesion and Blush

The blush resistance test demonstrates the ability of an applied coating to resist attack by various solutions. Adhesion is tested by the cross-hatch adhesion test wherein razor blades make perpendicular crosshatch patterns in an applied coating. Adhesive tape is applied to the crosshatch patterns, then the adhesive tape is removed at a 90° C. angle in a fast movement. The amount of applied coating remaining as the metal substrate then is determined. The applied coating was rated for adhesion according to the following system:

0—perfect
1—very slight pick off from edges of squares
2—slight pick off (1–2%)
3—moderate pick off (2–50%)
4—severe pick off (>50%)
5—very severe, crosshatching removes the coating.

The samples were rated for blushing as follows:

0—perfect
1—very slight haze on surface
2—slight cloudy appearance
3—moderate cloudy appearance
4—very cloudy and dull appearance, possible discoloration.

Sterilization Tests

These tests are performed to determine how well the applied coating withstands processing conditions for different types of foods packaged in metal containers.

| Processing Test Solutions | |
|---|---|
| Solution D | Demineralized water |
| Solution S[1] | 40 g concentrated acetic acid |
| | 24 g gelatin |
| | 24 g sodium chloride |
| | 0.4 g crystalline sodium sulfide ($Na_2S \cdot 9\,H_2O$) |
| | q.s. water to about 800 ml |
| Solution R[1] | 16 g citric acid crystals |
| | 3.2 g vitamin C (ascorbic acid) |
| | q.s. water to about 800 ml |
| Solution O[1] | 16 g citric acid crystals |
| | 0.2 g $H_2O_2$ hydrogen peroxide (30% sol.) |
| | 0.8 g $NH_4NO_3$ ammonium nitrate |
| | q.s. water to about 800 ml |

[1]The test solutions D, S, R, O have been chosen for cans containing a wide variety of food filling; these tests are conducted for 1 hour at 121° C.

Retort Test

The retort test was performed to evaluate the resistance and adhesion of coatings under food processing conditions (90 minutes @250° F. and 15 psi)

Wedge Bend Test

This test is performed using an IG 1125 instrument available from Gardner (USA). A coated substrate is prefolded and held on the anvil of the instrument. A weight of four pounds is dropped from a height of 25 inches onto a metal block that is suspended on one side. The loose side of the block deforms the metal substrate in a conical shape at a force of 100 in/lb. The coating on the exterior side of the metal substrate is examined for cracks. The percent of 100 mm conical length that does not show porosity after the deformation is the reported Wedge Bend flexibility value.

Mi (Lactic Acid), Cy (Cysteine) and NaCl/HAC (Sodium Chloride/Acetic Acid) Tests A coated substrate is formed into a 4-Kant Dose container, then a test solution is added to the 4-Kant Dose and held at 120° C. for one hour. The lactic acid solution is a 1% aqueous lactic acid solution. The cysteine solution contains 0.45 g cysteine and about 10 g of phosphate per liter of aqueous solution. The NaCl/HAC solution contains 2% sodium chloride and 3% acetic acid in water.

Civo-Test

A 4-Kant Dose container is placed in a larger container, and the larger container is filled with a 3% aqueous acetic acid solution. The large container is heated to 70° C. and held for two hours. The container then is cooled, and stored for 10 days at 40° C. The 4-Kant Dose container then is inspected for defects.

Examples 1 through 9 and 11 through 14 illustrate powder coating compositions containing blends of a first and second polyester having Tg's that differ by at least 5 C°, either containing or free of an optional modifying polymer. Example 10 is a comparative example containing low Tg polyesters and a phenoxy resin. Examples 1–9 and 11–14 illustrate both pigmented and unpigmented powder coating compositions.

The properties of applied coating compositions resulting from the powder coating compositions of Examples 1–14 are set forth in the following Table 1. These tests were performed on panels coated with about 80μ to about 100μ of a composition of Examples 1–14. Each coated aluminum panel then was heated at 260° C., 280° C., or 300° C. for 40 seconds. In general, the results summarized in Table 1 show PET and PBT polyesters improve the adhesion of a copolyester to a metal substrate. Accordingly, a modifying resin, which promotes adhesion, can be excluded from the powder coating composition. Examples 1–14 show that blends of polyesters gave good film properties, and that including a low amount of a copolyester improved performance, e.g., less blushing was observed. The ability to use a polyester, like PET or PBT, has the benefits of lowering the cost of the composition without adversely affecting applied coating composition performance.

| | Ex. 1 | Ex. 2 | Ex. 3 | Ex. 4 |
|---|---|---|---|---|
| Adhesion After Sterilization (1 hr., 121° C.) | | | | |
| Tin Plate | average–poor | good–average | average–poor | poor |
| Steel | very good | very good | very good | very good |
| Appearance After Sterilization[1] | good | good | good | good |
| Wedge Bend | | | | |
| immediately | 100/100 | 100/100 | | |
| after 24 hours | 100/100 | 100/100 | | |
| after 7 days | 100/100 | 0/96 | | |
| Flexibility | good–very good | good–very good | average–poor | very good |
| Dent-Crack Test | poor | poor | average | average |
| Film Appearance after heating for 40 seconds | | | | |
| 300° C. | | | average | good |
| 280° C. | | | average–poor | good–average |
| 260° C. | | | poor | average |
| Adhesion Untreated (heated for 40 seconds 260° C.–300° C.) | | | very good | very good |
| 30 min in water | | | poor | average–poor |
| after sterilization | average | good | very poor | very poor |
| Wedge Bend (heated for 40 seconds 260° C.–300° C.), quenched | very good | very good | very good | very good |

-continued

|  | Ex. 5 | Ex. 6 | Ex. 7 | Ex. 8 |
|---|---|---|---|---|
| Adhesion After Sterilization (1 hr., 121° C.) | | | | |
| Tin Plate | very good | very good | very good | very good |
| Steel | | | | |
| Appearance After Sterilization[1] | average | average | average | average |
| Wedge Bend | | | | |
| immediately | average–poor | average | average–poor | average–poor |
| after 24 hours | | | | |
| after 7 days | | | | |
| Flexibility | | | | |
| Dent-Crack Test | very good–good | average–poor | very good–good | average–poor |
| Film Appearance after heating for 40 seconds | | | | |
| 300° C. | average | average | average | average |
| 280° C. | average | average | average | average |
| 260° C. | | | | |
| Adhesion Untreated (heated for 40 seconds 260° C.–300° C.) | very good | very good | very good | very good |
| 30 min in water | very good | very good | very good | very good |
| after sterilization | good | good | good–average | good |
| Wedge Bend (heated for 40 seconds 260° C.–300° C.), quenched | average | good–average | average | average |

|  | Ex. 9 | Ex. 10 | Ex. 12 | Ex. 13 |
|---|---|---|---|---|
| Adhesion After Sterilization (1 hr., 121° C.) | | | | |
| Tin Plate | very good | very good | good | good |
| Steel | | | very good | very good |
| Appearance After Sterilization[1] | average | good | average | average |
| Wedge Bend | | | | |
| immediately | average | good | 90/94 | 84/89 |
| after 24 hours | | | 80/88 | 79/82 |
| after 7 days | good–average | good–average | 77/79 | 73/79 |
| Flexibility | | | good–average | good–average |
| Dent-Crack Test | average–poor | very good | very good | very good |
| Film Appearance after heating for 40 seconds | | | | |
| 300° C. | average | | | |
| 280° C. | average | very good | | |
| 260° C. | | | | |
| Adhesion Untreated (heated for 40 seconds 260° C.–300° C. | very good | very good | | |
| 30 min in water | very good | very good | | |
| after sterilization | good | good–average | | |
| Wedge Bend (heated for 40 seconds 260° C.–300° C.), quenched | good–average | | | |

Obviously, many modifications and variations of the invention as hereinbefore set forth can be made without departing from the spirit and scope thereof, and, therefore, only such limitations should be imposed as are indicated by the appended claims.

What is claimed is:

1. A composition comprising:
   (a) about 50% to about 100%, by total weight of the composition, of a blend of polyesters comprising (i) a first polyester having a weight average molecular weight of about 10,000 to about 80,000 and a glass transition temperature of greater than 45° C. to about 100° C., and (ii) a second polyester having a weight average molecular weight of about 10,000 to about 70,000 and a glass transition temperature of about −10° C. to about 45° C., wherein the Tg of the first polyester is about 5 C° to about 60 C° higher than the Tg of the second polyester, and wherein the first polyester and the second polyester are present in a weight range of about 1 to 3 to about 1 to 9;
   (b) 0% to about 25%, by total weight of the composition, of a modifying resin selected from the group consisting of an epoxy or phenoxy resin having an epoxy equivalent weight of about 500 to about 15,000, an end-capped epoxy resin having a weight average molecular weight of about 300 to about 10,000, an acrylic resin having a weight average molecular weight of about 15,000 to about 100,000, a polyolefin resin having a weight average molecular weight of about 15,000 to about 1,000,000, and mixtures thereof;
   (c) 0% to about 50%, by total weight of the composition, of an inorganic filler; and
   (d) 0% to about 4%, by total weight of the composition, of a flow control agent; and
   (e) 0% to about 50%, by total weight of the composition, of a second modifying polymer, said composition in the form of a powder having a particle size of 100 microns or less.

2. A method of coating a metal substrate comprising:
(a) providing a solid, powder coating composition having a particle size of 100 microns or less comprising:
  (i) about 50% to about 100%, by total weight of the composition, of a blend of polyesters comprising (A) a first polyester having a weight average molecular weight of about 10,000 to about 80,000 and a glass transition temperature of greater than 45° C. to about 100° C., and (B) a second polyester having a weight average molecular weight of about 10,000 to about 70,000 and a glass transition temperature of about −10° C. to about 45° C., wherein the Tg of the first polyester is about 5 C° to about 60 C° higher than the Tg of the second polyester, and wherein the first polyester and the second polyester are present in a weight range of about 1 to 3 to about 1 to 9;
  (ii) 0% to about 25%, by total weight of the composition, of a modifying resin selected from the group consisting of an epoxy or phenoxy resin having an epoxy equivalent weight of about 500 to about 15,000, an end-capped epoxy resin having a weight average molecular weight of about 300 to about 10,000, an acrylic resin having a weight average molecular weight of about 15,000 to about 100,000, a polyolefin resin having a weight average molecular weight of about 15,000 to about 1,000,000, and mixtures thereof;
(b) electrostatically charging the powder coating composition;
(c) spraying the electrostatically charged powder coating composition onto a metal substrate to provide a layer of applied coating composition about one to about 200 microns thick on the metal substrate and provide a coated metal substrate; and
(d) heating the coated metal substrate at a temperature of about 120° C. to about 550° C. for about 5 to about 30 seconds.

3. The method of claim 2 wherein the powder coating composition further comprises:
  (iii) 0% to about 50%, by total weight of the composition, of an inorganic filler; and
  (iv) 0% to about 4%, by total weight of the composition, of a flow control agent.

4. The method of claim 3 wherein the heating step is performed at 180° C. to about 450° C. for about 15 to about 20 seconds.

5. The method of claim 3 wherein the coating composition comprises 0% to about 30% by total weight of the composition of an inorganic filler.

6. The method of claim 3 wherein the inorganic filler is selected from the group consisting of clay, mica, aluminum silicate, fumed silica, magnesium oxide, zinc oxide, barium oxide, calcium sulfate, calcium oxide, aluminum oxide, magnesium aluminum oxide, zinc aluminum oxide, magnesium titanium oxide, iron titanium oxide, calcium titanium oxide, and mixtures thereof.

7. The method of claim 3 wherein the flow control agent comprises an acrylic resin.

8. The method of claim 2 wherein the powder coating composition further comprises up to about 50%, by total weight of the composition, of a second modifying polymer.

9. The method of claim 8 wherein the second modifying polymer is a thermoplastic polymer.

10. The method of claim 8 wherein the second modifying polymer is a thermoset polymer.

11. The method of claim 8 wherein the second modifying polymer is selected from the group consisting of a carboxylated polyester, a carboxylated polyolefin, a polyamide, a fluorocarbon resin, a polycarbonate, a stirene resin, an acrylonitrile-butadiene-stirene resin, a chlorinated polyether, a urethane resin, and mixtures thereof.

12. The method of claim 8 wherein the second modifying polymer is capable of providing a coated metal substrate having a nongloss appearance.

13. The method of claim 2 wherein the metal substrate is selected from the group consisting of aluminum, tin-free steel, tinplate, steel, zinc-plated steel, zinc alloy-plated steel, lead-plated steel, lead alloy-plated steel, aluminum-plated steel, aluminum alloy-plated steel, and stainless steel.

14. The method of claim 2 wherein the coating composition is free of organic solvents.

15. The method of claim 2 wherein the Tg of the first polyester is about 15 C° to about 35 C° higher than the Tg of the second polyester.

16. The method of claim 2 wherein the coating composition comprises about 60% to about 85%, by total weight of the composition, of the polyester blend.

17. The method of claim 2 wherein the first and second polyesters have a melt viscosity of about 200 to about 3000 Pa·s at 200° C., and a softening point of about 120° C. to about 280° C.

18. The method of claim 2 wherein the first and second polyesters have an acid number of 0 to about 150 mg KOH/g and a hydroxyl number of 0 to about 150 mg KOH/g.

19. The method of claim 2 wherein the first and second polyesters have a melt viscosity of about 250 to about 2000 Pa·s at 280° C.

20. The method of claim 2 wherein the first and second polyesters have a melt flow index of about 800 g/10 min at 200° C. or about 5 g/10 min. at 280° C.

21. The method of claim 2 wherein the first and second polyesters comprise condensation product of (i) a dicarboxylic acid or an esterifiable derivative of a dicarboxylic acid, and (ii) an aliphatic diol, wherein at least 60 mol % of the dicarboxylic acid or dicarboxylic acid derivative is an aromatic dicarboxylic acid.

22. The method of claim 21 wherein the aromatic dicarboxylic acid is selected from the group consisting of phthalic acid, isophthalic acid, 5-tert-butyl isophthalic acid, terephthalic acid, a naphthalene dicarboxylic acid, and mixtures thereof.

23. The method of claim 2 wherein the first and second polyesters comprise the reaction product of (i) a dicarboxylic acid or an esterifiable derivative of a dicarboxylic acid, and (ii) a low molecular weight epoxy resin having an EEW of about 150 to about 500.

24. The method of claim 2 wherein the first and second polyesters are selected from the group consisting of a polyethylene terephthalate, a polybutylene terephthalate, a polyethylene naphthanate, a polybutylene naphthanate, a copolyester, a polytrimethylene terephthalate, a polytrimethylene naphthanate, and mixtures thereof.

25. The method of claim 2 wherein the coating composition comprises about 2% to about 20%, by total weight of the composition, of a modifying resin.

26. The method of claim 2 wherein the modifying resin comprises an epoxy resin having an epoxy equivalent weight of about 2000 to about 8000.

27. The method of claim 2 wherein the epoxy resin is a solid material containing an average of about 1.5 to about 2.5 epoxy groups per molecule of the epoxy resin.

28. The method of claim 2 wherein the epoxy resin is a solid material containing an average of about 2.5 to about 6 epoxy groups per molecule of the epoxy resin.

29. The method of claim 2 wherein the epoxy resin comprises a mixture of an epoxy resin having about 1.5 to about 2.5 epoxy groups per molecule of the epoxy resin and an epoxy resin having about 2.5 to about 6 epoxy groups per molecule of the epoxy resin.

30. The method of claim 2 wherein the epoxy resin is an aromatic epoxy resin.

31. The method of claim 2 wherein the modifying resin is an end-capped epoxy resin that is end-capped with an alcohol, a phenol, a carboxylic acid, a secondary amine, a mercaptan, an oxo-acid of phosphorus, or a mixture thereof.

32. The method of claim 2 wherein the modifying resin is an acrylic resin having a weight average molecular weight of about 20,000 to about 80,000.

33. The method of claim 2 wherein the acrylic resin is a homopolymer or a copolymer of homopolymer and copolymers of acrylic acid, methacrylic acid, esters of acrylic acid, esters of methacrylic acid, acrylamides, and methacrylamides.

34. The method of claim 2 wherein the modifying resin is a polyolefin resin having a weight average molecular weight of about 25,000 to about 750,000.

35. The method of claim 2 wherein the polyolefin resin is a homopolymer or a copolymer of ethylene, propylene, ethylene, propylene blends, 1-butene, and 1-pentene.

36. The method of claim 2 wherein the polyolefin comprises a functionalized olefin.

37. The method of claim 2 wherein the layer of applied coating composition is about 10 to about 150 microns thick.

38. The method of claim 2 wherein the layer of applied coating composition is about 40 to about 100 microns thick.

39. The method of claim 2 wherein the coating composition further comprises a pigment, an organic dye, or a mixture thereof.

* * * * *

UNITED STATES PATENT AND TRADEMARK OFFICE
CERTIFICATE OF CORRECTION

PATENT NO. : 6,270,855 B1
DATED : August 7, 2001
INVENTOR(S) : Jung et al.

It is certified that error appears in the above-identified patent and that said Letters Patent is hereby corrected as shown below:

<u>Column 26,</u>
Line 4, "stirene" should be -- styrene --
Line 5, "stirene" should be -- styrene --

Signed and Sealed this

Ninth Day of April, 2002

Attest:

JAMES E. ROGAN
*Attesting Officer*   *Director of the United States Patent and Trademark Office*